(12) United States Patent
Kishigami (10) Patent No.: US 10,365,349 B2
(45) Date of Patent: Jul. 30, 2019

(54) RADAR DEVICE

(71) Applicant: Panasonic Corporation, Osaka (JP)

(72) Inventor: Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 15/195,600

(22) Filed: Jun. 28, 2016

(65) Prior Publication Data

US 2017/0212213 A1 Jul. 27, 2017

(30) Foreign Application Priority Data

Aug. 6, 2015 (JP) .................................. 2015-155863

(51) Int. Cl.

| *G01S 7/02* | (2006.01) |
|---|---|
| *G01S 7/03* | (2006.01) |
| *G01S 13/04* | (2006.01) |
| *G01S 13/22* | (2006.01) |
| *G01S 13/26* | (2006.01) |
| *G01S 13/28* | (2006.01) |
| *G01S 13/32* | (2006.01) |

(Continued)

(52) U.S. Cl.
CPC .............. *G01S 7/282* (2013.01); *G01S 7/023* (2013.01); *G01S 7/03* (2013.01); *G01S 13/04* (2013.01);

(Continued)

(58) Field of Classification Search
CPC ...... G01S 7/282; G01S 13/325; G01S 13/284; G01S 13/26; G01S 7/03; G01S 7/023; G01S 13/04; G01S 13/22; G01S 13/931

(Continued)

(56) References Cited

U.S. PATENT DOCUMENTS

| 8,970,429 B2 * | 3/2015 | Pickle | G01S 13/726 |
|---|---|---|---|
| | | | 342/159 |
| 2007/0064590 A1 * | 3/2007 | Prokop | H04J 13/0044 |
| | | | 370/208 |

(Continued)

FOREIGN PATENT DOCUMENTS

| JP | 61-096482 | 5/1986 |
|---|---|---|
| JP | 2015-132556 A | 7/2015 |
| WO | 2014/147980 A1 | 9/2014 |

OTHER PUBLICATIONS

Tseng et al., "Complementary Sets of Sequences", IEEE Transactions on Information Theory, vol. IT-18, No. 5, Sep. 1972 (Year: 1972).*

(Continued)

*Primary Examiner* — Frank J McGue
(74) *Attorney, Agent, or Firm* — Seed IP Law Group LLP (57) ABSTRACT

A radar device includes: radar transmitting circuitry which, in operation, generates Nt radar signals by modulating Nt transmission code sequences and transmits the radar signals via Nt transmission antennas, Nt being more than 1; and radar receiving circuitry which, in operation, receives reflection wave signals via Nr reception antennas and performs Doppler frequency analysis, Nr being more than 1. The radar transmitting circuitry stores a predetermined pulse sequence and Nt or more orthogonal code sequences, second half elements of the Nt or more orthogonal code sequences are arranged in an order reverse to first half elements of the Nt or more orthogonal code sequences and generates each of the Nt transmission code sequences by multiplying elements of the predetermined pulse sequence by elements of the Nt or more orthogonal code sequences different from each other.

4 Claims, 7 Drawing Sheets

(51) Int. Cl.
 *G01S 7/282* (2006.01)
 *G01S 13/93* (2006.01)
(52) U.S. Cl.
 CPC .............. *G01S 13/22* (2013.01); *G01S 13/26* (2013.01); *G01S 13/284* (2013.01); *G01S 13/325* (2013.01); *G01S 13/931* (2013.01)
(58) Field of Classification Search
 USPC ........................................................ 342/195
 See application file for complete search history.

(56) References Cited

U.S. PATENT DOCUMENTS

| | | | | |
|---|---|---|---|---|
| 2009/0168730 A1* | 7/2009 | Baum | .................... | H04L 5/0007 370/336 |
| 2015/0168546 A1 | 6/2015 | Nakagawa et al. | | |
| 2015/0198700 A1 | 7/2015 | Morita et al. | | |
| 2016/0048422 A1* | 2/2016 | Tanaka | ................ | G06F 11/1004 714/764 |

OTHER PUBLICATIONS

Li et al., "MIMO Radar with Colocated Antennas", IEEE Signal Processing Magazine, Sep. 2007 (Year: 2007).*
S. Z. Budisin, "New complementary pairs of sequences" Electronics Letters, vol. 26, No. 13, pp. 881-883, 1990.
Jian Li, et al., "MIMO Radar with Colocated Antennas" Signal Processing Magazine, IEEE vol. 24, Issue: 5, pp. 106-114, 2007.
C. C. Tseng et al., "Complementary Sets of Sequences" IEEE Transactions on Information Theory, vol. IT-18, No. 5, pp. 644-652, 1972.

* cited by examiner

RADAR DEVICE

BACKGROUND

1. Technical Field

The present disclosure relates to a radar device.

2. Description of the Related Art

In recent years, studies have been conducted on a high-resolution radar device using a radar transmission signal having a short wavelength including a microwave or a millimeter wave. Furthermore, in order to improve outdoor safety, there are demands for development of a radar device (wide-angle radar device) that detects objects (hereinafter referred to as targets) including not only a vehicle but also a pedestrian in a wide-angle range.

For example, as a radar device, a pulse radar device that repeatedly emits a pulse wave is known. A wide-angle pulse radar that detects a vehicle and a pedestrian in a wide-angle range receives a signal that is a mixture of a plurality of reflected waves from a target existing at a short distance (e.g., a vehicle) and a target existing at a long distance (e.g., a pedestrian). Accordingly, (1) a radar transmitting unit need be configured to transmit a pulse wave or a pulse-modulated wave having an autocorrelation characteristic of a low range sidelobe (hereinafter referred to as a low-range-sidelobe characteristic) and (2) a radar receiving unit need be configured to have a wide reception dynamic range.

A pulse-compression radar device using a Barker code, an M sequence code, or a complementary code has been proposed as a radar device using a pulse wave or a pulse modulated wave for obtaining a low-range-sidelobe characteristic. For example, a complementary code is made up of two code sequences (complementary code sequences). For example, in a case where the two code sequences are $a_n$ and $b_n$ (n=1, ..., L (a code sequence length)), a result of adding (see the following formula (3)) results of autocorrelation computation of the two code sequences (see the following formulas (1) and (2) where $a_n$=0 and $b_n$=0 in a case where n>L or N<1, and the asterisk (*) represents a complex conjugate operator) by uniforming respective shift times $\tau$ is 0 when $\tau \neq 0$, and a correlation value in which a range sidelobe is 0 is obtained:

$$R_{aa}(\tau) = \sum_{n=1}^{L} a_n a_{n+\tau}^* \quad \text{formula (1)}$$

$$R_{bb}(\tau) = \sum_{n=1}^{L} b_n b_{n+\tau}^* \quad \text{formula (2)}$$

$$\begin{cases} R_{aa}(\tau) + R_{bb}(\tau) \neq 0, & \text{when } \tau = 0 \\ R_{aa}(\tau) + R_{bb}(\tau) = 0, & \text{when } \tau \neq 0 \end{cases} \quad \text{formula (3)}$$

A method for generating a complementary code is disclosed in Budisin, S.Z., "New complementary pairs of sequences," Electronics Letters, Vol. 26, Issue: 13, pp. 881-883, 1990. According to this method, complementary codes having code lengths L of 4, 8, 16, 32, ..., and $2^P$ can be sequentially generated on the basis of code sequences a=[1, 1] and b=[1, −1] that are complementary to each other in which an element is "1" or "−1". A required reception dynamic range of a radar device is wider as the code length is longer. However, use of a complementary code allows a peak sidelobe ratio (PSR) to be made lower even in a case where the code length is shorter. Accordingly, even in a case where a plurality of reflected waves from a target existing at a short distance and a target existing at a long distance are mixed, the dynamic range of a radar device required for reception can be reduced. Meanwhile, in a case where an M sequence code is used, the PSR is given by 20 log(1/L), and a code length L (for example, L=1024 in a case where PSR=60 dB) that is longer than that in the case where a complementary code is used is needed in order to obtain a low range sidelobe.

Examples of a configuration of a wide-angle radar device include the following two configurations.

A first wide-angle radar device is configured to transmit a radar wave by mechanically or electronically scanning a pulse wave or a modulated wave by using a directional beam of a narrow angle (a beam width of approximately several degrees) and receive a reflected wave by using a directional beam of a narrow angle. In the wide-angle radar device of the first configuration, scanning need be performed many times in order to obtain high resolution, and therefore trackability of a target that moves at a high speed deteriorates.

A second wide-angle radar device is configured to use a method (Direction of Arrival (DOA) estimation) in which a reflected wave is received by an array antenna made up of a plurality of antennas (antenna elements) and an arrival angle of the reflected wave is estimated by a signal processing algorithm based on a reception phase difference corresponding to an array antenna spacing. In the wide-angle radar device of the second configuration, an arrival direction can be estimated on a reception side even in a case where a scanning interval of a transmission beam on a transmission side is shortened. It is therefore possible to shorten a scanning time and to improve trackability as compared with the wide-angle radar device of the first configuration. Examples of an arrival direction estimation method include Fourier transform based on matrix operation, a Capon method and an LP (Linear Prediction) method based on inverse matrix operation, and an MUSIC (Multiple Signal Classification) and an ESPRIT (Estimation of Signal Parameters via Rotational Invariance Techniques) based on eigenvalue computation.

Furthermore, a configuration (hereinafter referred to as an MIMO radar) in which a plurality of antennas (an array antenna) are provided not only on a reception side but also on a transmission side and beam scanning is performed by signal processing using the transmission and reception array antennas has been proposed as a radar device (see, for example, Jian Li, Petre Stoica, "MIMO Radar with Collocated Antennas", Signal Processing Magazine, IEEE Vol. 24, Issue: 5, pp. 106-114, 2007).

In the MIMO radar, a virtual reception array antenna made up of as many antenna elements as the product of the number of transmission antenna elements and the number of reception antenna elements at most can be realized by appropriately disposing the antenna elements in the transmission and reception array antennas. This produces an effect of increasing an effective aperture length of the array antennas with a small number of elements.

Furthermore, a method for detecting the present or absence of a target in a wide-angle range by using an MIMO radar has been proposed. The MIMO radar transmits, via a plurality of transmission antennas, orthogonal multiplexed signals that can be separated on a reception side. For example, orthogonal code sequences (see, for example, C.C. Tseng, C. L. Liu, "Complementary sets of sequences", Information Theory, IEEE Transactions on Vol. 18, Issue: 5, pp. 644-652, 1972) is applied as the orthogonal multiplexed signals.

Furthermore, Japanese Unexamined Patent Application Publication No. 61-96482 discloses a radar system that suppresses interference between sector radars by using mathematically orthogonal complementary codes as transmission codes in a plurality of (e.g., two) radars.

However, in the MIMO radar device using code multiplexing, as a relative speed between the MIMO radar device and a target increases, a Doppler phase fluctuation caused by Doppler frequency shift increases, and interference between code multiplexed signals increases. When interference between the code multiplexed signals increases, it becomes difficult to independently extract waves reflected by a target from respective antennas, positioning performance of the MIMO radar device deteriorates, and incorrect detection or failure of detection of a target are more likely to occur.

SUMMARY

One non-limiting and exemplary embodiment provides a radar device that can reduce interference between code multiplexed signals in a case where a Doppler frequency shift occurs.

In one general aspect, the techniques disclosed here feature A radar device includes: radar transmitting circuitry which, in operation, generates Nt radar signals by modulating Nt transmission code sequences and transmits the generated Nt radar signals via Nt transmission antennas that are different from each other, Nt being more than 1; and radar receiving circuitry which, in operation, receives reflection wave signals that are the radar signals reflected by a target via Nr reception antennas, performs Doppler frequency analysis, Nr being more than 1, wherein the radar transmitting circuitry stores a predetermined pulse sequence and Nt or more orthogonal code sequences that have a predetermined code length and are orthogonal to each other, second half elements of the Nt or more orthogonal code sequences are arranged in an order reverse to first half elements of the Nt or more orthogonal code sequences and generates each of the Nt transmission code sequences by multiplying elements of the predetermined pulse sequence by elements of the Nt or more orthogonal code sequences that are different from each other.

According to the aspect of the present disclosure, it is possible to reduce interference between code multiplexed signals in a case where a Doppler frequency shift occurs.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiment

An aspect according to the present disclosure proposes orthogonal code sequences that reduce mutual interference between radar transmission signals (code multiplexed signals transmitted by an MIMO radar) that occurs due to a Doppler phase fluctuation under an environment in which a Doppler phase fluctuation occurs due to a fluctuation of a relative distance between a target and the radar. According to the aspect according to the present disclosure, it is therefore possible to reduce interference between code multiplexed signals in a case where a Doppler frequency shift occurs.

An embodiment according to the aspect of the present disclosure is described in detail below with reference to the drawings. In the embodiment, identical constituent elements are given identical reference signs, and overlapping description thereof is omitted.

A configuration of an MIMO radar using coded pulses in which a radar device transmits different transmission signals (coded pulses) that have been code division multiplexed via a plurality of transmission antennas on a transmission side and separates the transmission signals and performs reception processing on a reception side is described below.

Configuration of Radar Device

Figure 1:
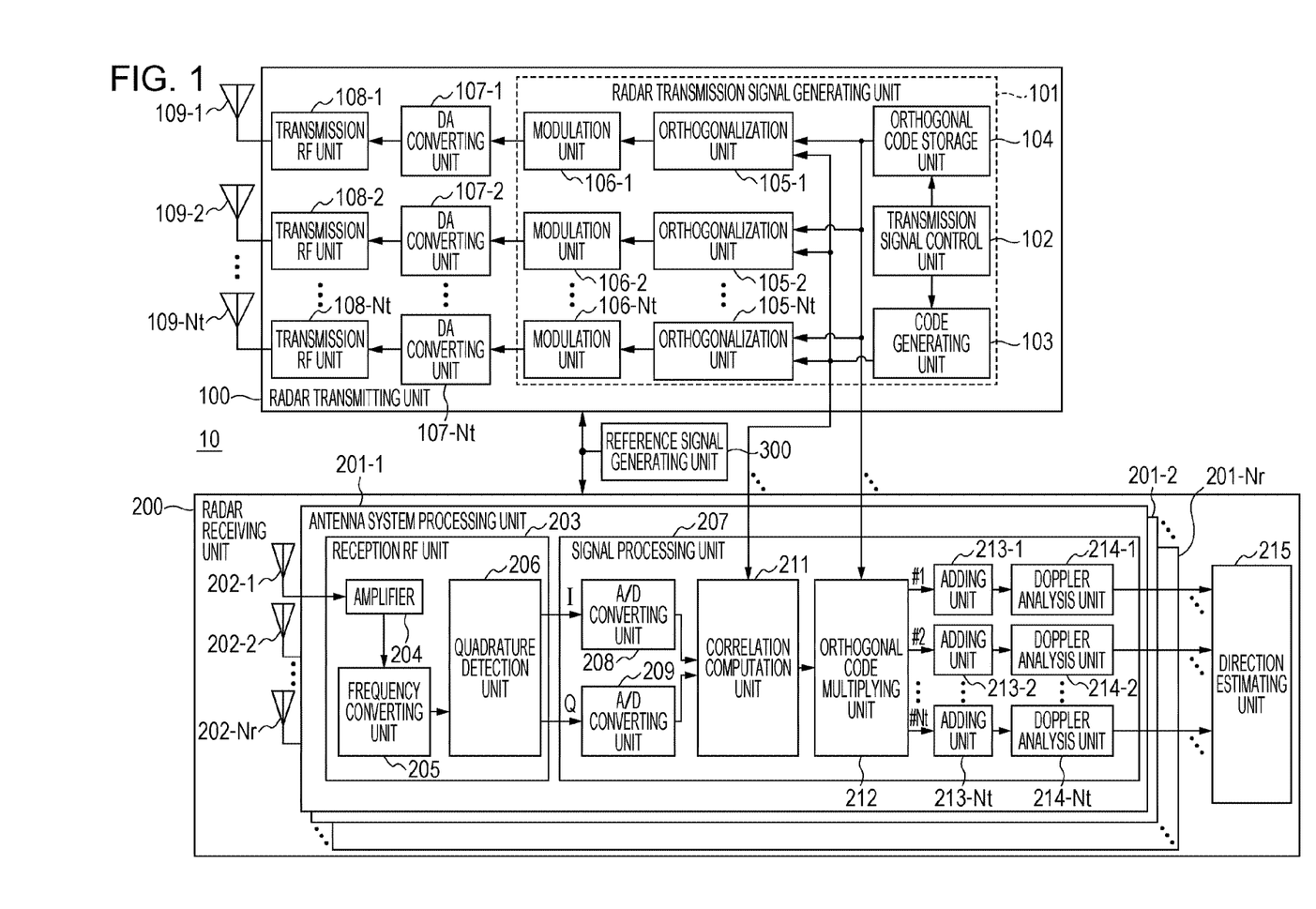
FIG. 1 is a block diagram illustrating a configuration of a radar device according to an embodiment of the present disclosure.

FIG. 1 is a block diagram illustrating a configuration of a radar device 10 according to the present embodiment.

The radar device 10 includes a radar transmitting unit 100, a radar receiving unit 200, and a reference signal generating unit 300.

The radar transmitting unit 100 generates high-frequency (radio frequency) radar signals (radar transmission signals) on the basis of a reference signal received from the reference signal generating unit 300. Then, the radar transmitting unit 100 transmits the radar transmission signals on a predetermined transmission cycle by using a transmission array antenna made up of a plurality of transmission antennas 109-1 to 109-Nt (Nt is more than 1).

The radar receiving unit 200 receives reflected wave signals that are the radar transmission signals reflected by a target (not illustrated) by using a reception array antenna made up of a plurality of reception antennas 202-1 to 202-Nr (Nr is more than 1). The radar receiving unit 200 performs at least one of detection of the presence or absence of a target and estimation of a direction of the target by performing signal processing on the reflected signals received via antennas 202 by using a reference signal received from the reference signal generating unit 300. Note that the target is an object that is to be detected by the radar device 10 and encompasses, for example, a vehicle and a human.

The reference signal generating unit 300 is connected to the radar transmitting unit 100 and the radar receiving unit 200. The reference signal generating unit 300 supplies a common reference signal to the radar transmitting unit 100 and the radar receiving unit 200 so as to synchronize the processing in the radar transmitting unit 100 and the processing in the radar receiving unit 200.

Configuration of Radar Transmitting Unit 100

The radar transmitting unit 100 has a radar transmission signal generating unit 101, DA (Digital Analog) converting unit 107-1 to 107-Nt, transmission RF (Radio Frequency) units 108-1 to 108-Nt, and the transmission antennas 109-1 to 109-Nt. That is, the radar transmitting unit 100 has Nt transmission antennas 109 that are connected to the respective transmission RF units 108 and the respective DA converting units 107.

The radar transmission signal generating unit 101 generates a timing clock that is a predetermined multiple of a reference signal received from the reference signal generating unit 300 and then generates Nt baseband radar transmission signals on the basis of the generated timing clock.

Then, the radar transmission signal generating unit 101 outputs the generated radar transmission signals in a predetermined radar transmission period (Tr) plural times (Na times) per radar positioning. Na is an even number since a basic unit of a complementary code is two codes having complementarity.

A radar transmission signal is expressed by $r_z(k, m) = I_z(k, m) + jQ_z(k, m)$ where z (z=1, ..., Nt) is a number of a corresponding transmission antenna 109, j is an imaginary unit, and k is a discrete time. The discrete time k is variable within a range from a start timing (k=1) of a radar transmission period (Tr) to a discrete sample point immediately before the end of the radar transmission period Tr. Note that $I_z(k, m)$ represents a signal (hereinafter referred to as an I signal (In-phase signal)) of an in-phase component of the baseband radar transmission signal, and $Q_z(k, m)$ is a signal (hereinafter referred to as a Q signal (Quadrature signal)) of a quadrature component of the baseband radar transmission signal. Note that m is an ordinal number of a radar transmission period, and m=1, ..., Na since a radar transmission signal is transmitted Na times per radar positioning.

The radar transmission signal generating unit 101 includes a transmission signal control unit 102, a code generating unit 103, an orthogonal code storage unit 104, orthogonalization units 105-1 to 105-Nt, and modulation units 106-1 to 106-Nt.

The transmission signal control unit 102 controls the code generating unit 103 and the orthogonal code storage unit 104 in the radar transmitting unit 100. With the arrangement, the orthogonalization units 105 generate transmission code sequences to be output, and the modulation units 106 generate Nt complex baseband radar transmission signals $r_z(k, m)$ on the basis of the generated transmission code sequences. Details will be described later.

The code generating unit 103 stores therein a code CC(s) made up of a predetermined number ($N_{code}$) of complementary codes and supplies predetermined codes (pulse sequences) stored therein to the orthogonalization units 105-1 to 105-Nt on the basis of a control signal supplied from the transmission signal control unit 102. Note that s=1, ..., $N_{code}$, and $N_{code}$ is an even number (two or more) since a basic unit of a complementary code is two codes having complementarity. For example, $N_{code}$ is $2 \times L_{cc}$ in a case where a Spano code that is a combination of a plurality of complementary codes is used. Note that $L_{cc}$ is the code length of the code CC(s).

An example of how the transmission signal control unit 102 controls the code generating unit 103 is described below.

A control signal supplied from the transmission signal control unit 102 to the code generating unit 103 gives an instruction (hereinafter referred to as an output code instruction) about a code to be output in each radar transmission period (Tr). The output code instruction is described below.

The transmission signal control unit 102 gives an output code instruction to the code generating unit 103, for example, as follows.

(Step A1) The transmission signal control unit 102 instructs the code generating unit 103 to sequentially output Nb codes (CC(1), ..., CC(Nb)) as a single unit in accordance with a predetermined number of repetitions. The number of repetitions is $L_{oc}$ times ($L_{oc}$ is the code length of an orthogonal code sequence stored in the orthogonal code storage unit 104 that will be described later).

(Step A2) When the $L_{oc}$ repetitions are finished (Nb×$L_{oc}$ output code instructions), the transmission signal control unit 102 instructs the code generating unit 103 to sequentially output subsequent Nb codes (CC(Nb+1), ..., CC(2Nb)) as a single unit in accordance with the predetermined number of ($L_{oc}$) repetitions.

(Step A3) After that, the operations in Steps A1 and A2 are repeated. Note that the transmission signal control unit 102 returns to CC(1) after outputting CC($N_{code}$) and outputs output code instructions in a cyclic manner.

(Step A4) Since single radar positioning is Na radar transmission periods (Tr), the transmission signal control unit 102 presets values of Na, Nb, and $L_{oc}$ so that Na/(Nb×$L_{oc}$) is an integer, and ends the operations when output of Na output code instructions is finished.

In a case where radar positioning is repeated, the operations in Steps A1 to A4 are repeated.

Note that Nb is equal to or smaller than $N_{code}$, and Nb is an even number (2 or more) since a basic unit of a complementary code is two codes having complementarity. In a case where a Spano code that is a combination of a plurality of complementary codes is used, Nb is 2, 4, or 8. A pair of complementary codes that are complementary to each other are successively read out. For example, CC(1) and CC(2) are a pair of complementary codes, and CC(3) and CC(4) are a pair of complementary codes. The same applies to CC(5) and subsequent codes. A pair of complementary codes that are complementary to each other are codes that offset each other's sidelobes that occur at the time of autocorrelation computation.

The code CC(s) includes a code having a code length $L_{cc}$, and elements thereof can be expressed by the following formula (4):

$$CC(s) = \{cc(s)_1, cc(s)_2, \ldots, cc(s)L_{cc}\} \qquad \text{formula (4)}$$

where each element of the code is $\{1, -1\}$ or $\{1, -1, j, -j\}$.

The orthogonal code storage unit 104 stores therein, for respective Nt multiplexed signals, Nt orthogonal code sequences (code length $L_{oc}$) that are orthogonal to each other and supplies predetermined elements (hereinafter also referred to simply as elements) of the stored orthogonal code sequences to the orthogonalization units 105-1 to 105-Nt on the basis of a control signal supplied from the transmission signal control unit 102.

Element of an orthogonal code sequence OC(z) for a z-th (z=1, ..., Nt) multiplexed signal can be expressed by the following formula (5):

$$OC(z) = \{oc(z)_1, oc(z)_2, \ldots, oc(z)_{L_{oc}}\} \quad \text{formula (5)}$$

Since the Nt orthogonal code sequences stored in the orthogonal code storage unit 104 are orthogonal to each other, a correlation characteristic between any orthogonal code sequences $OC(z_1)$ and $OC(z_2)$ have a relationship expressed by the following formula (6):

$$OC(z_1) \cdot OC(z_2) = [oc(z_1)_1 \times oc(z_2)_1^* + oc(z_1)_2 \times oc(z_2)_2^* + \ldots + oc(z_1)_{L_{oc}} \times oc(z_2)_{L_{oc}}^*] = \begin{cases} L_{oc} & \text{if } z_1 = z_2 \\ 0 & \text{if } z_1 \neq z_2 \end{cases} \quad \text{formula (6)}$$

where the asterisk (*) is a complex conjugate operator.

Furthermore, in the present embodiment, an orthogonal code sequence having the code length $L_{oc}$ used for Nt multiplexes has a relationship such that latter elements are arranged in an order reverse to that of former elements as expressed by the following formula (7):

$$oc(z)_n = \begin{cases} oc(z)_n & \text{if } 1 \leq n \leq L_{oc}/2 \\ oc(z)_{L_{oc}-n+1} & \text{if } L_{oc} \geq n > L_{oc}/2 \end{cases} \quad \text{formula (7)}$$

The number of multiplexes Nt and the code length $L_{oc}$ of the orthogonal code sequence have a relationship expressed by the following formula (8):

$$L_{oc} = 2^{\alpha+1}, \alpha \leq \text{ceil}(\log_2 Nt) \quad \text{formula (8)}$$

where ceil[x] is an operator that gives a minimum integer equal to or larger than x.

Note that elements of an orthogonal code sequence in a range of n from not less than 1 to not more than $L_{oc}/2$ may be generated by using a Walsh code or an orthogonal M sequence code that is a known orthogonal code sequence. For example, in a case where Nt=4, $L_{oc}$=8, and elements of an orthogonal code sequence in a range of n from not less than 1 to not more than $L_{oc}/2$ are generated by using a Walsh code, the elements can be expressed by the following formula (9):

$$OC(1) = \{1,1,1,1,1,1,1,1\},$$

$$OC(2) = \{1,-1,1,-1,-1,1,-1,1\},$$

$$OC(3) = \{1,1,-1,-1,-1,-1,1,1\},$$

$$OC(4) = \{1,-1,-1,1,1,-1,-1,1\},$$

Correlation computation using the orthogonal code sequences, for example, between an orthogonal code sequence $OC(z_1, \varphi)$ received by the radar receiving unit under the influence of a Doppler phase fluctuation $\varphi$ in each radar transmission period and an orthogonal code sequence $OC(z_2)$ transmitted by the radar transmitting unit can be expressed by the following formula (10):

Note that the correlation computation expressed by the formula (10) corresponds to a separating receiving operation that is performed, by arithmetic processing in an orthogonal code multiplying unit and adding units of the radar receiving unit that will be described later, on radar transmission signals multiplexed by using the orthogonal code sequences Nt times in the radar transmitting unit.

$$OC(z_1, \phi) \cdot OC(z_2) = \sum_{l=1}^{L_{oc}} oc(z_1)_l \exp\{j(l-1)\phi\} oc(z_2)_l^* = \quad \text{formula (10)}$$

$$oc(z_1)_1 oc(z_2)_1^* [\exp\{j(1-1)\phi\} + \exp\{j(L_{oc}-1)\phi\}] +$$

$$oc(z_1)_2 oc(z_2)_2^* [\exp\{j(2-1)\phi\} + \exp\{j(L_{oc}-2)\phi\}] +$$

$$\ldots + oc(z_1)_{L_{oc}/2} oc(z_2)_{L_{oc}/2}^* [\exp\{j(L_{oc}/2-1)\phi\} +$$

$$\exp\{j(L_{oc}/2)\phi\}] = 2\exp\{j(L_{oc}-1)\phi/2\}$$

$$\left[\sum_{l=1}^{L_{oc}/2} oc(z_1)_l oc(z_2)_l^* \cos\{((L_{oc}+1)/2-l)\phi\}\right]$$

According to the formula (10), mutual correlation computation between the orthogonal code sequence $OC(z_1, \varphi)$ received under the influence of the Doppler phase fluctuation $\varphi$ in each radar transmission period and the orthogonal code sequence $OC(z_2)$ is equivalent to mutual correlation computation between elements of an orthogonal code sequence having a code length $L_{oc}/2$ and $oc(z_1)_l \cos\{((L_{oc}+1)/2-l)\varphi\}$ affected by a fluctuation of a real-number component due to the Doppler phase fluctuation $\varphi$. Note that $l=1, \ldots, L_{oc}/2$.

As described above, in a case where the orthogonal code sequences according to the present embodiment are used, mutual correlation computation between a complex reception signal affected by a Doppler phase fluctuation $\varphi$ and an orthogonal code sequence is mutual correlation computation affected by a fluctuation of a real-number component of a complex reception signal due to the Doppler phase fluctuation $\varphi$. It is therefore possible to reduce the influence of interference between orthogonal code sequences caused by the Doppler phase fluctuation $\varphi$.

An example of how the transmission signal control unit 102 controls the orthogonal code storage unit 104 is described below.

A control signal supplied from the transmission signal control unit 102 to the orthogonal code storage unit 104 gives an instruction (hereinafter referred to as an element output instruction) about an element that is to be output in each radar transmission period (Tr). The element output instruction is described below.

The transmission signal control unit 102 gives the element output instruction to the orthogonal code storage unit 104, for example, as follows.

(Step B1) The transmission signal control unit 102 instructs the orthogonal code storage unit 104 to output the first element $oc(z)_1$ of an orthogonal code sequence OC(z) Nb times. Note that z=1, ..., Nt.

(Step B2) When Nb outputs are finished (Nb elements output instructions), the transmission signal control unit 102 instructs the orthogonal code storage unit 104 to output the second element $oc(z)_2$ of the orthogonal code sequence OC(z) Nb times.

(Step B3) After that, the operations in Steps B1 and B2 are repeated. Note that after an instruction to output an $L_{oc}$-th element $oc(z)L_{oc}$ of the orthogonal code sequence OC(z) Nb times is given, the transmission signal control unit 102 returns to the first element $oc(z)_1$ of the orthogonal code sequence OC(z) and outputs an element output instruction in a cyclic manner.

(Step B4) Since single radar positioning is Na radar transmission periods (Tr), the transmission signal control unit 102 presets values of Na, Nb, and $L_{oc}$ so that $Na/(Nb \times L_{oc})$ is an integer, and ends the operations when output of Na element output instructions is finished.

Furthermore, in a case where radar positioning is performed repeatedly, the operations in Steps B1 to B4 are repeated.

Each of the orthogonalization units 105-1 to 105-Nt generates a transmission code sequence by multiplying a code supplied from the code generating unit 103 in each radar transmission period (Tr) by an element of an orthogonal code sequence supplied from the orthogonal code storage unit 104 in each radar transmission period (Tr) and then supplies the transmission code sequence to a corresponding one of the modulation units 106-1 to 106-Nt.

That is, a z-th (z=1, . . . , Nt) orthogonalization unit 105 generates a transmission code sequence $oc(z)_\beta \times OC(s_{(m)})$ by multiplying a code $OC(s_{(m)})$ supplied from the code generating unit 103 in each radar transmission period (Tr) by an element $oc(z)_{\beta(m)}$ of an orthogonal code sequence supplied from the orthogonal code storage unit 104 in each radar transmission period (Tr). Note that $s_{(m)}$ is a number of code that is output in accordance with an instruction (output code instruction) given by the transmission signal control unit 102 in an m-th (m=1, . . . , Na) radar transmission period and is a value in a range from 1 to $N_{code}$. Note that $_{\beta(m)}$ is a number of an element of an orthogonal code sequence that is output in accordance with an instruction (element output instruction) given by the transmission signal control unit 102 in the m-th radar transmission period and is a value in a range from 1 to $L_{oc}$.

A transmission code sequence that is output by the z-th orthogonalization unit 105 in the m-th radar transmission period (Tr) can be expressed by the formula (11). Note that in the formula (11), z=1, . . . , Nt, and m=1, . . . , Na.

$$A(z,m)=\{a(z,m)_1, a(z,m)_2, \ldots, a(z,m)_{Lcc}\}=\{oc(z)_{\beta(m)} \times cc(s_{(m)})_1, oc(z)_{\beta(m)} \times cc(s_{(m)})_2, \ldots, oc(z)_{\beta(m)} \times cc(s_{(m)})_{Lcc}\}\ldots \quad \text{formula (11)}$$

A z-th (z=1, . . . , Nt) modulation unit 106 performs pulse modulation (amplitude modulation, ASK (Amplitude Shift Keying), pulse shift keying) or phase modulation (PSK (Phase Shift Keying)) on the transmission code sequence A(z,m) that is output by the z-th orthogonalization unit 105 and then supplies a digital signal thus obtained to a corresponding one of the DA converting units 107-1 to 107Nt. Note that the z-th modulation unit 106 may output the modulated signal as a baseband radar transmission signal restricted within a predetermined band by passing the modulated signal through a band-limiting filter (LPF; Low Pass Filter).

A z-th (z=1, . . . , Nt) DA converting unit 107 converts the digital signal that is output by the z-th modulation unit 106 into a baseband radar transmission signal that is an analog signal and then supplies the baseband radar transmission signal to a corresponding one of the transmission RF units 108-1 to 108-Nt.

A z-th (z=1, . . . , Nt) transmission RF unit 108 generates a radar transmission signal in a predetermined carrier frequency band by frequency conversion of the baseband radar transmission signal that is output by the z-th DA converting unit 107, amplifies the radar transmission signal to predetermined transmission power P[dB] by using a transmission amplifier, and then supplies the radar transmission signal to a corresponding one of the transmission antennas 109-1 to 109-Nt.

A z-th (z=1, . . . , Nt) transmission antenna 109 radiates the radar transmission signal that is output by the z-th transmission RF unit 108 into a space.

Figure 2:
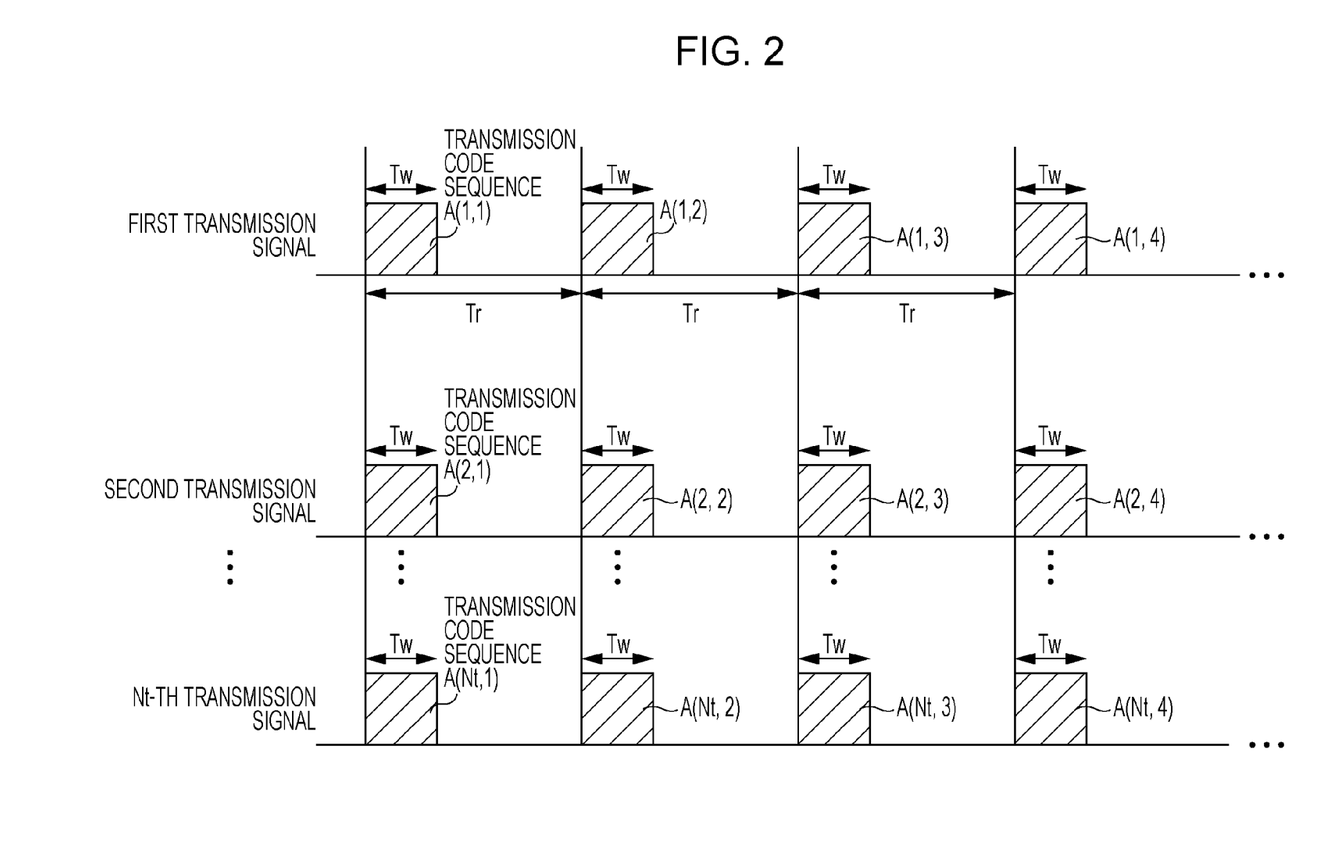
FIG. 2 is a diagram illustrating an example of radar transmission signals according to the embodiment of the present disclosure.

FIG. 2 illustrates radar transmission signals transmitted from the Nt transmission antennas 109-1 to 109-Nt of the radar transmitting unit 100. In each radar transmission period Tr, a transmission code sequence (pulse code sequence) is transmitted during a code transmission interval Tw, and no signal is transmitted during a remaining interval (Tr−Tw). A transmission code sequence having a code length $L_{CC}$ is included in the code transmission interval Tw. Since pulse modulation using No samples per sub-pulse is performed, signals of Nr (=No×$L_{CC}$) samples are included in each code transmission interval Tw. Meanwhile, Nu samples are included in the interval (Tr−Tw) in which no signal is transmitted.

Note that the radar transmitting unit 100 may change a transmission timing depending on a multiplexed signal. By changing the transmission timing, it is possible to reduce instantaneous peak power at the time of transmission, and therefore it is possible to increase transmission power.

Figure 3:
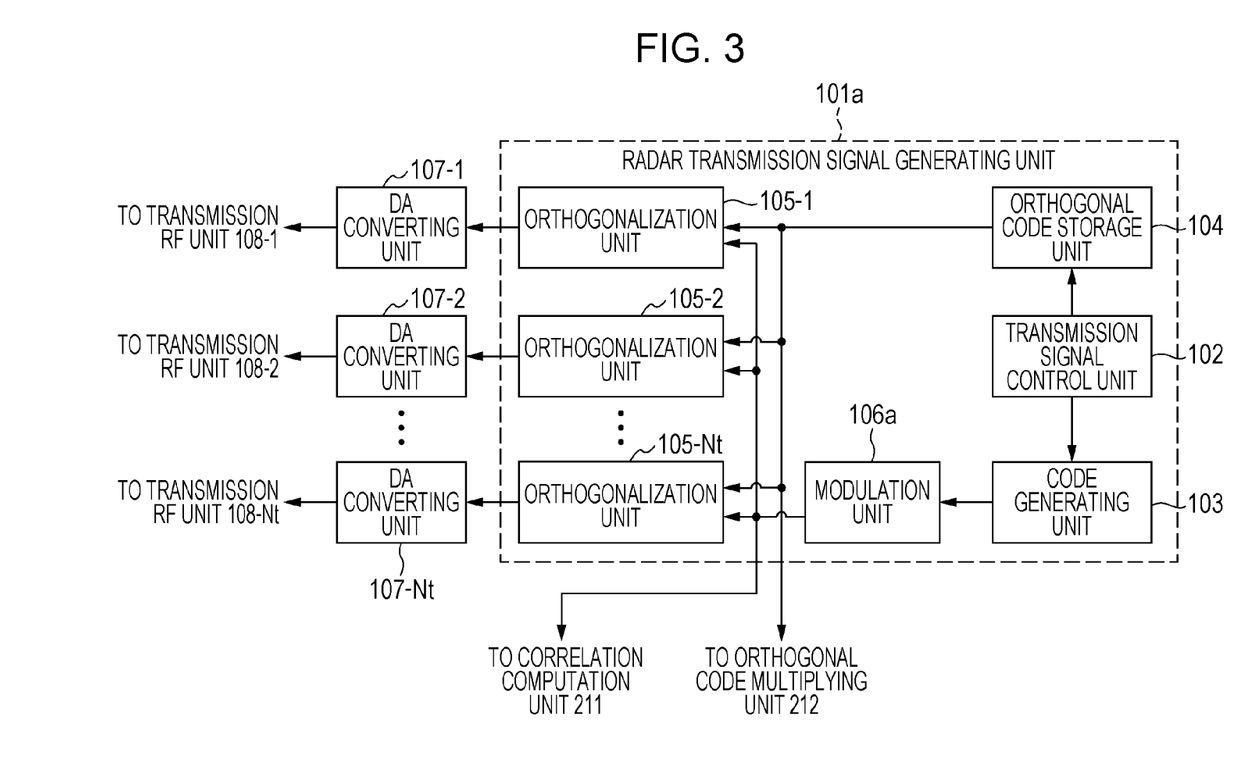
FIG. 3 is a block diagram illustrating another configuration of a radar transmission signal generating unit according to the embodiment of the present disclosure.

The radar transmitting unit 100 may include a radar transmission signal generating unit 101*a* illustrated in FIG. 3 instead of the radar transmission signal generating unit 101 illustrated in FIG. 1. The radar transmission signal generating unit 101*a* includes a modulation unit 106*a* instead of the modulation units 106-1 to 106-Nt illustrated in FIG. 1. Basic functions of the modulation unit 106*a* are the same as those of the modulation units 106-1 to 106-Nt. The modulation unit 106*a* performs predetermined modulation on a code that is output by the code generating unit 103 and supplies a result of the modulation to the orthogonalization units 105-1 to 105-Nt. In the configuration illustrated in FIG. 3, only one modulation unit is needed, and therefore the circuit configuration can be simplified.

Note that different complementary codes may be used for respective multiplexed signals. In this case, a plurality of correlators are needed for reception processes in a plurality of antennas, and therefore the circuit scale increases, but it is possible to further increase the effect of suppressing interference between multiplexed signal.

Configuration of Radar Receiving Unit 200

In FIG. 1, the radar receiving unit 200 includes Nr reception antennas 202-1 to 202-Nr that constitute an array antenna. Furthermore, the radar receiving unit 200 has Nr antenna system processing units 201-1 to 201-Nr and a direction estimating unit 215.

Each reception antenna 202 receives a reflected wave signal that is a radar transmission signal reflected by a target (object) and then supplies the received reflected wave signal to corresponding one of the antenna system processing units 201 as a reception signal.

Each antenna system processing unit 201 has a reception RF unit 203 and a signal processing unit 207.

The reception RF unit 203 has an amplifier 204, a frequency converting unit 205, and a quadrature detection unit 206. The reception RF unit 203 generates a timing clock that is a predetermined multiple of a reference signal received from the reference signal generating unit 300 and operates on the basis of the generated timing clock.

Specifically, the amplifier 204 amplifies a reception signal received from each reception antenna 202 to a predetermined level. The frequency converting unit 205 converts a frequency of a reception signal in a high-frequency band into a baseband. The quadrature detection unit 206 converts the baseband reception signal into a baseband reception signal including an I signal and a Q signal. Note that in the frequency conversion in the transmission RF unit 108 and the reception RF unit 203, the radar device 10 can reduce influence of a phase error by using a common local oscillator or common source oscillation.

The signal processing unit 207 performs signal processing on each baseband signal received by the reception antenna 202. The signal processing unit 207 has A/D (Analog Digital) converting units 208 and 209, a correlation computation unit 211, an orthogonal code multiplying unit 212, adding units 213-1 to 213-Nt, and Doppler analysis units 214-1 to 214-Nt. An operation of a d-th signal processing unit 207 is described below. Note that d=1, . . . , Nr.

The A/D converting unit 208 receives an I signal from the quadrature detection unit 206, and the A/D converting unit 209 receives a Q signal from the quadrature detection unit 206. The A/D converting unit 208 converts the I-signal into digital data by performing sampling on a baseband signal including the I signal at a discrete time. The A/D converting unit 209 converts the Q signal into digital data by performing sampling on a baseband signal including the Q signal at a discrete time.

In the sampling in the A/D converting units 208 and 209, discrete sampling is performed Ns times per time Tp (=Tw/L) of a single sub-pulse in a radar transmission signal. That is, the number of over samples per sub-pulse is Ns.

In the following description, a baseband reception signal at a discrete time k in an m-th (m=1, . . . , Na) radar transmission period Tr[m] that is an output of the A/D converting units 208 and 209 is expressed as a complex number signal $x^{(d)}(k,m)=Ir^{(d)}(k,m)+jQr^{(d)}(k,m)$ by using the I signal $Ir^{(d)}(k,m)$ and the Q signal $Qr^{(d)}(k, m)$. In the following description, the signal processing unit 207 periodically performs measurement at discrete times k from a timing (k=1) of the start of the radar transmission period (Tr) to a sampling point k=(Nr+Nu) Ns/No before the end of the radar transmission period Tr. That is, k=1, . . . , (Nr+Nu) Ns/No. Note that j is an imaginary unit, and d=1, . . . , Nr.

The correlation computation unit 211 performs correlation computation between a discrete sample value $x^{(d)}(k,m)$ including the discrete sample values $Ir^{(d)}(k,m)$ and $Qr^{(d)}(k,m)$ received from the A/D converting units 208 and 209 and a code $CC(s_{(m)})$ that is output by the code generating unit 103 in accordance with an output code instruction given by the transmission signal control unit 102 in each radar transmission period Tr. Note that $CC(s_{(m)})$ represents a code that is output in accordance with an output code instruction given by the transmission signal control unit 102 in an m-th radar transmission period. For example, a correlation computation value $AC^{(d)}(k,m)$ of sliding correlation computation with the code $CC(s_{(m)})$ in the m-th radar transmission period is calculated, for example, on the basis of the following formula (12):

$$AC^{(d)}(k, m) = \sum_{n=1}^{Lcc} x^{(d)}(k + N_s(n-1), m) cc(s_{(m)})_n^* \qquad \text{formula (12)}$$

In the formula (12), the asterisk (*) represents a complex conjugate operator.

The correlation computation unit 211 performs correlation computation over a period of k=1, . . . , (Nr+Nu) Ns/No, for example, in accordance with the formula (12).

Figure 4:
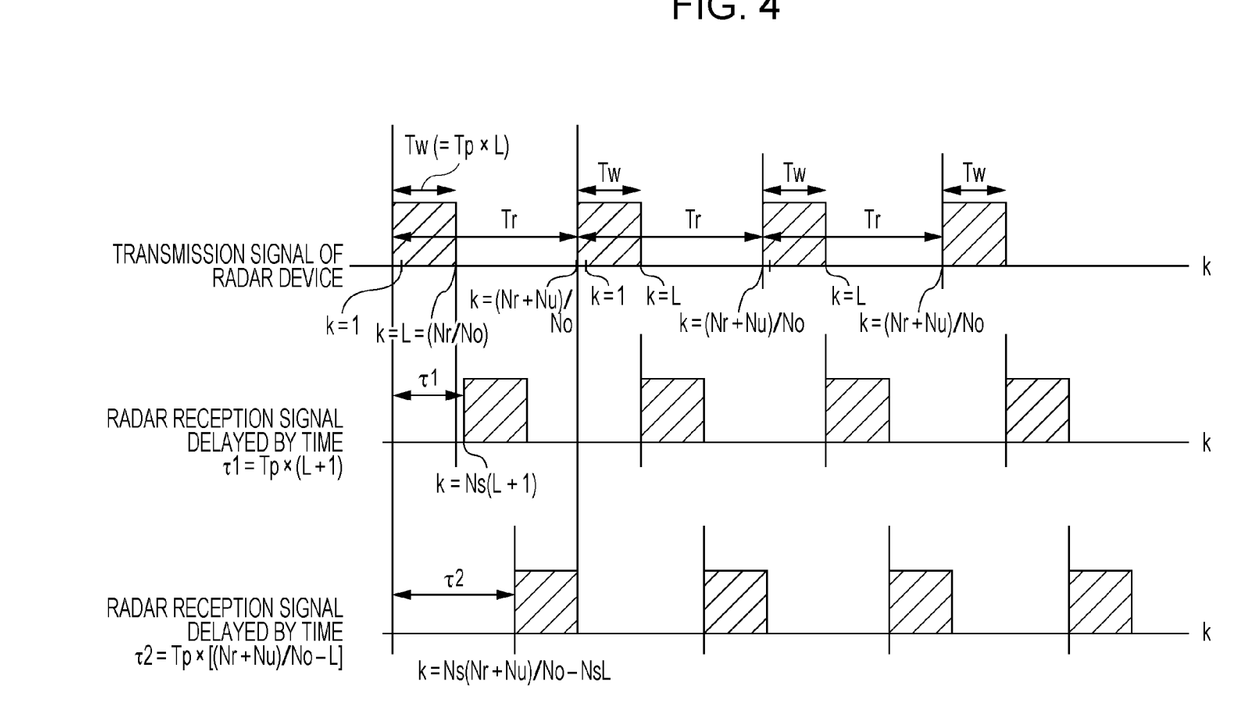
FIG. 4 is a diagram illustrating an example of transmission timings of radar transmission signals and a measurement range according to the embodiment of the present disclosure.

The present embodiment is not limited to the case where the correlation computation unit 211 performs correlation computation over the period of k=1, . . . , (Nr+Nu) Ns/No. The measurement range (i.e., the range of k) may be limited in accordance with a range in which a target is to be measured by the radar device 10 exists. This makes it possible to reduce the amount of arithmetic processing of the correlation computation unit 211 in the radar device 10. For example, the correlation computation unit 211 may limit the measurement range to k=Ns (L+1), . . . , (Nr+Nu) Ns/No−NsL. In this case, as illustrated in FIG. 4, the radar device 10 does not perform measurement during a time interval corresponding to the code transmission interval Tw.

Even in a case where a radar transmission signal directly goes around to the radar receiving unit 200, this allows the radar device 10 to perform measurement excluding the influence of the radar transmission signal going around to the radar receiving unit 200 because the correlation computation unit 211 does not perform processing during a period (at least a period of less than τ1) in which the radar transmission signal goes around to the radar receiving unit 200. In a case where the measurement range (the range of k) is limited, the adding units 213, the Doppler analysis units 214, and the direction estimating unit 215 that are described below also perform processing in the limited measurement range (the limited range of k). This makes it possible to reduce the amount of processing in each of these units, thereby reducing power consumption in the radar receiving unit 200.

The orthogonal code multiplying unit 212 multiplies $(AC^{(d)}(k,m) \times oc(z)_{\beta(m)}^*)$ the correlation computation value $AC^{(d)}(k,m)$ that is output by the correlation computation unit 211 at each discrete time k by a complex conjugate value $oc(z)_{\beta(m)}^*$ of an element $oc(z)_{\beta(m)}$ of an orthogonal code sequence that is output for each multiplexed signal by the orthogonal code storage unit 104 in accordance with an element output instruction given by the transmission signal control unit 102. Note that z=1, . . . , Nt, and d=1, . . . , Nr.

The adding units 213 add up the multiplied values $AC^{(d)}(k,m) \times oc(z)_{\beta(m)}^*$ received from the orthogonal code multiplying unit 212 at each discrete time k of the m-th radar transmission period Tr over plural (Np) radar transmission periods Tr (Tr×Np). The addition in the adding units 213 can be expressed by the following formula (13):

$$CI_{(z)}^{(d)}(k, m_c) = \sum_{g=1}^{N_p} AC^{(d)}(k, N_p(m_c - 1) + g) \times oc(z)_{mod[ceil[g/Nb]-1,Loc]+1}^* \qquad \text{formula (13)}$$

In the formula (13), mod [x,y] is an operator indicative of a remainder of division (x/y). By setting Np to an integer multiple of (Nb×$L_{oc}$) that is an orthogonalization unit of an orthogonal code sequence, code demultiplexing of Nt code multiplexed signals can be performed before Doppler analysis.

In the formula (13), $m_c$ is an integer of 1 or more. This allows the radar device 10 to improve an SNR due to the effect of addition in a time range in which addition is performed Np times and in a range in which a reception signal of a reflected wave from a target has high correlation. It is therefore possible to improve measurement performance concerning estimation of arrival distance of a target. In the formula (13), z=1, . . . , Nt.

In order for the radar device 10 to obtain an ideal addition gain, it is necessary that phase components be uniform in a certain range in an addition interval in which addition is performed Np times. That is, it is preferable that Np be set on the basis of an assumed maximum moving speed of a target to be measured. This is because as the assumed maximum speed of the target becomes higher, the amount of fluctuation of a Doppler frequency included in a reflected wave from the target becomes larger and a period of high correlation becomes shorter. In this case, the number of additions Np is small, and accordingly the gain improvement effect produced by addition in the adding units 213 is small.

Details of code demultiplexing of Nt code multiplexed signals are described below.

For example, Nb=2, $L_{oc}$=8, and Np=(Nb×$L_{oc}$)=16. Since an orthogonal code sequence OC(z) is transmitted by using (Nb×$L_{oc}$) (orthogonalization unit) radar transmission periods, the first output $CI_{(z)}^{(d)}(k,1)$ from the adding units 213 can be expressed by the following formula (14):

$$CI_{(z)}^{(d)}(k, 1) = \sum_{g=1}^{16} AC^{(d)}(k, g) \times oc(z)^*_{mod[ceil[g/2]-1,16]+1} = \quad \text{formula (14)}$$

$$\{AC^{(d)}(k, 1) + AC^{(d)}(k, 2)\} \times oc(z)^*_1 +$$
$$\{AC^{(d)}(k, 3) + AC^{(d)}(k, 4)\} \times oc(z)^*_2 + \ldots +$$
$$\{AC^{(d)}(k, 15) + AC^{(d)}(k, 16)\} \times oc(z)^*_8$$

Assume that a reflected wave signal from a single target arrives at the radar device 10 at a discrete time $k_0$ under an ideal condition that the reception signal include no noise. In a case where the reflected wave signal includes no phase fluctuation caused by a Doppler frequency fluctuation, the radar device 10 obtains, in the formula (14), a low-range-sidelobe characteristic expressed by the formula (15) due to a property of complementary codes that are output by the code generating unit 103 and a property of elements of an orthogonal code sequence that are output by the orthogonal code storage unit 104. In the formula (15), γ represents propagation channel complex attenuation.

$$CI_{(z)}^{(d)}(k, 1) = \begin{cases} 16L_{cc}\gamma(= N_p L_{cc}\gamma), & \text{if } k = k_0 \\ 0, & \text{if } k \neq k_0 \end{cases} \quad \text{formula (15)}$$

The Doppler analysis units 214 perform coherent integration while uniforming timings of the discrete times k by using, as a single unit, $CI_{(z)}^{(d)}(k,Nc(w-1)+1)$ to $CI_{(z)}^{(d)}(k, Nc×w)$ that are Nc outputs of the adding units 213 obtained at each discrete time k. For example, the Doppler analysis units 214 perform coherent integration after correcting a phase fluctuation φ (fs)=2πfs(Tr×Np)Δφ according to 2Nf different Doppler frequencies fsΔφ as indicated by the following formula (16):

$$FT\_CI_{(z)}^{(d)}(k, f_s, w) = \sum_{q=0}^{N_c-1} CI_{(z)}^{(d)}(k, N_c(w-1) + q + 1)\exp[-j\phi(f_s)q] \quad \text{formula (16)}$$

$$= \sum_{q=0}^{N_c-1} CI_{(z)}^{(d)}(k, N_c(w-1) + q + 1)\exp$$
$$[-j2\pi f_s T_r N_p q \Delta\phi]$$

In the formula (16), $FT\_CI_{(z)}^{(d)}(k,fs,w)$ is a w-th output of the Doppler analysis units 214 and denotes a result of coherent integration of the Doppler frequencies fsΔφ for a z-th transmission signal at the discrete time k. Note that fs=−Nf+1, . . . , Nf, and k=1, . . . , (Nr+Nu) Ns/No. Note also that w is an integer of 1 or more, and Δφ is a phase rotation unit.

In this way, the radar device 10 obtains $FT\_CI_{(1)}^{(d)}(k,-Nf+1,w)$, . . . , $FT\_CI_{(Nt)}^{(d)}(k,Nf+1,w)$, which are results of coherent integration according to 2Nf Doppler frequency components obtained for transmission signals #1 to #Nt at each discrete time k, every plural (Np×Nc) radar transmission periods Tr (Tr×Np×Nc). Note that j is an imaginary unit, z=1, . . . , Nt, and Na=Np×Nc.

In a case where Δφ=1/Nc, the processing of the Doppler analysis units 214 is equivalent to discrete Fourier transform (DFT) processing of output of the adding units 213 at a sampling interval Tm=(Tr×Np) at a sampling frequency fm=1/Tm.

By setting Nf to a power of 2, fast Fourier transform (FFT) processing can be applied in the Doppler analysis units 214. This makes it possible to markedly reduce the amount of computation. In a case where Nf>Nc, the Doppler analysis units 214 can also apply FFT processing by performing zero padding so that CI(k,Nc(w−1)+q)=0 in a region where q>Nc, thereby markedly reducing the amount of computation.

The Doppler analysis units 214 may sequentially perform the multiply-accumulate operation indicated by the formula (7) instead of performing FFT processing. That is, the Doppler analysis units 214 may generate a coefficient exp [−j2πfsTrNpqΔco] corresponding to fs=−Nf+1, . . . , 0, . . . , Nf−1 for $CI_{(z)}^{(d)}(k,Nc(w-1)+q+1)$ that is NC outputs of the adding units 213 obtained at each discrete time k and then sequentially perform the multiply-accumulate operation. Note that q=0 to Nc−1.

In the following description, $FT\_CI_{(z)}^1(k,fs,w)$, . . . , $FT\_CI_{(z)}^{Nr}(k,fs,w)$ that are w-th outputs obtained by performing similar processing in the Nr antenna system processing units 201 are referred to as h(k,fs,w) as elements of a column vector as indicated by the formula (17). Hereinafter, the column vector h(k,fs,w) expressed by the formula (17) is referred to as a virtual reception array correlation vector. The virtual reception array correlation vector h(k,fs,w) includes Nt×Nr (the product of the number of transmission antennas Nt and the number of reception antennas Nr) elements. The virtual reception array correlation vector h(k,fs,w) is used for description of direction estimation processing (described later) performed on reflected signals from a target on the basis of phase differences among the reception antennas 202. In the following description, some of the elements of the virtual reception array correlation vector h(k,fs,w) are sometimes referred to by using a column vector defined by the formula (18). Note that z=1, . . . , Nt, and d=1, . . . , Nr.

$$h(k, fs, w) = \begin{bmatrix} FT\_CI^1_{(1)}(k, fs, w) \\ FT\_CI^1_{(2)}(k, fs, w) \\ \vdots \\ FT\_CI^1_{(Nt)}(k, fs, w) \\ FT\_CI^2_{(1)}(k, fs, w) \\ FT\_CI^2_{(2)}(k, fs, w) \\ \vdots \\ FT\_CI^2_{(Nt)}(k, fs, w) \\ \vdots \\ FT\_CI^{Nr}_{(1)}(k, fs, w) \\ FT\_CI^{Nr}_{(2)}(k, fs, w) \\ \vdots \\ FT\_CI^{Nr}_{(Nt)}(k, fs, w) \end{bmatrix} = \begin{bmatrix} h^1(k, fs, w) \\ h^2(k, fs, w) \\ \vdots \\ h^{Nr}(k, fs, w) \end{bmatrix} \quad \text{formula (17)}$$

$$h^d(k, fs, w) = \begin{bmatrix} FT\_CI^d_{(1)}(k, fs, w) \\ FT\_CI^d_{(2)}(k, fs, w) \\ \vdots \\ FT\_CI^d_{(Nt)}(k, fs, w) \end{bmatrix} \quad \text{formula (18)}$$

The processing in each unit of the signal processing unit 207 has been described above.

The direction estimating unit 215 calculates a virtual reception array correlation vector $h\_after\_cal(k,fs,w)$ by correcting the virtual reception array correlation vector $(k,fs,w)$ of the w-th Doppler analysis unit 214 that is output by the antenna system processing units 201-1 to 201-Nr by using an array correction value $h\_cal_{[y]}$ on the basis of phase deviations and amplitude deviations among the antenna system processing units 201. The virtual reception array correlation vector $h\_after\_cal(k,fs,w)$ is expressed by the following formula (19). Note that $y=1, \ldots, (Nt \times Nr)$.

$$h\_after\_cal(k, fs, w) = CA h(k, fs, w) \quad \text{formula (19)}$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Nr]} \end{bmatrix}$$

Then, the direction estimating unit 215 performs direction estimating processing in a horizontal direction and a vertical direction on the basis of phase differences of reflected wave signals among the reception antennas 202 by using the virtual reception array correlation vector $h\_after\_cal(k,fs,w)$. The direction estimating unit 215 calculates a spatial profile in which an azimuth direction θ and an elevation direction φ of a direction estimation evaluation function value $P(\theta, \varphi, k, fs, w)$ are variable within a predetermined angular range, extracts a predetermined number of maximum peaks of the calculated spatial profile in a descending order, and determines an azimuth direction and an elevation direction of the maximum peaks as arrival direction estimation values.

The kind of evaluation function value $P(\theta, \varphi, k, fs, w)$ varies depending on an arrival direction estimation algorism. For example, an estimation method using an array antenna disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79 may be used.

For example, a beamformer method can be expressed by the formula (20). Alternatively, a method such as Capon, or MUSIC is also applicable.

$$P(\theta_u, \varphi_v, k, fs, w) = |a(\theta_u, \varphi_v)^H h\_after\_cal(k, fs, w)|^2 \cdots \quad \text{formula (20)}$$

In the formula (20), the superscript suffix H is an Hermitian transpose operator, and $a(\theta_u, \varphi_v)$ represents a direction vector of a virtual reception array for an arrival wave in an azimuth direction $\theta_u$ and an elevation direction $\varphi_v$.

As described above, the direction estimating unit 215 outputs, as a radar positioning result, the calculated w-th arrival direction estimation value, the discrete time k, the Doppler frequency $fs\Delta\varphi$, and the angle $\theta_u$.

The directional vector $a(\theta_u, \varphi_v)$ is a next column vector whose elements $(Nt \times Nr)$ are complex responses of the virtual reception array in a case where reflected wave signals that are reflected radar transmission signals arrive from the azimuth direction $\theta_u$ and the elevation direction $\varphi_v$. The complex responses $a(\theta_u, \varphi_v)$ of the virtual reception array represent phase differences that are geometric-optically calculated on the basis of elements spacing among the antennas.

Note that $\theta_u$ varies at a predetermined azimuth interval $\beta_1$ in an azimuth range in which arrival direction estimation is performed. For example, $\theta_u$ is set as follows:

$\theta_u = \theta\min + u\beta_1, u=0, \ldots, NU$ $NU = \text{floor}[(\theta\max - \theta\min)/\beta_1] + 1$ where floor(x) is a function that returns a maximum integer that does not exceed a real number x.

Note that $\varphi_v$ varies at a predetermined elevation interval $\beta_2$ in an elevation range in which arrival direction estimation is performed. For example, $\varphi_v$ is set as follows:

$\varphi_v = \varphi\min + v\beta_2, V=0, \ldots, NV$ $NV = \text{floor}[(\theta\max - \theta\min)/\beta_2] + 1$ In the present embodiment, it is assumed that the directional vector of the virtual reception array is calculated in advance on the basis of virtual reception array locations VA#1, ..., VA# (Nt×Nr) that will be described later. Elements of the directional vector of the virtual reception array represent phase differences that are geometric-optically calculated on the basis of elements spacing among the antennas in the order of numbers of the virtual reception array locations VA#1, ..., VA# (Nt×Nr) that will be described later.

The time information k may be output after being converted into distance information. The formula (21) can be used to convert the time information k into distance information R(k):

$$R(k) = k \frac{T_w C_0}{2L} \quad \text{formula (21)}$$

where $T_w$ is a code transmission interval, L is a pulse code length, and $C_0$ is the speed of light.

The Doppler frequency information $(fs\Delta\varphi)$ may be output after being converted into a relative speed component. The following formula (22) may be used to convert the Doppler frequency $fs\Delta\varphi$ into a relative speed component $v_d(fs)$:

$$v_d(f_s) = \frac{\lambda}{2} f_s \Delta\theta \quad \text{formula (22)}$$

where λ is the wavelength of a carrier frequency of an RF signal that is output by transmission RF units 108.

As described above, a radar transmission signal generated in the present embodiment has a property such that a low-range sidelobe characteristic and low mutual correlation characteristic between MIMO code multiplexed signals are obtained in a case where a reflected wave signal from a target does not include a phase fluctuation caused by a Doppler frequency fluctuation.

Even in a case where a reflected wave signal from a target includes a Doppler fluctuation, the low mutual correlation characteristic between MIMO code multiplexed signals can be maintained since a code having an effect of suppressing influence of a phase fluctuation caused by a Doppler fluctuation is used as an orthogonal code sequence.

Figure 5:
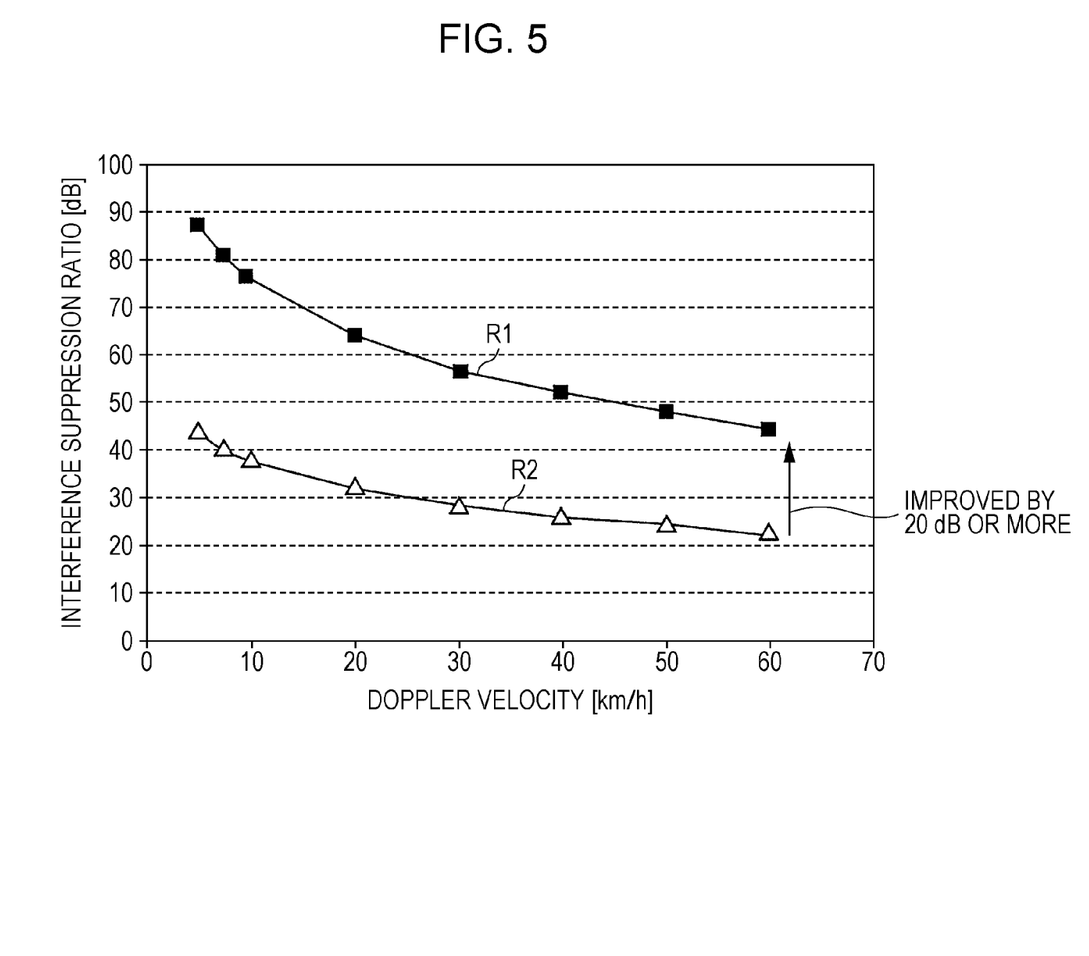
FIG. 5 is a diagram illustrating a ratio of suppression of interference between multiplexed signals calculated by using computer simulation.

A result of simulation obtained in a case where an orthogonal code sequence of the present embodiment is used is described below. FIG. 5 is a diagram illustrating a result of calculating a ratio of suppression of interference between multiplexed signals by using computer simulation in an environment in which the moving speed of a target is variable. In FIG. 5, the vertical axis represents the ratio [dB] of suppression of interference between multiplexed signals, and the horizontal axis represents a Doppler speed [km/h]. In FIG. 5, R1 represents an interference suppression ratio obtained in a case where an orthogonal code sequence W2 of the present embodiment is used relative to an orthogonal code sequence W1, and R2 represents an interference suppression ratio in a case where a conventional predetermined orthogonal code sequence is used relative to the orthogonal code sequence W1.

The orthogonal code sequence W1 has the following elements, and $L_{oc}=8$, Nt=5, and Nb=2:

CC(1)=[1,−1,1,−1,1,−1,1,−1]

CC(2)=[1,1,−1,−1,1,1,−1,−1]

CC(3)=[1,−1,−1,1,1,−1,−1,1]

CC(4)=[1,1,1,1,−1,−1,−1,−1]

CC(5)=[1,−1,1,−1,−1,1,−1,1]

The orthogonal code sequence W2 has the following elements, and $L_{oc}=16$, Nt=5, and Nb=2:

CC(1)=[1,−1,1,−1,1,−1,1,−1,−1,1,−1,1,−1,1,−1,1]

CC(2)=[1,1,−1,−1,1,1,−1,−1,−1,−1,1,1,−1,−1,1,1]

CC(3)=[1,−1,−1,1,1,−1,−1,1,1,−1,−1,1,1,−1,−1,1]

CC(4)=[1,1,1,1,−1,−1,−1,−1,−1,−1,−1,−1,1,1,1,1]

CC(5)=[1,−1,1,−1,−1,1,−1,1,1,−1,1,−1,−1,1,−1,1]

In the orthogonal code sequence W2, the latter eight elements are arranged in an order reverse to the former eight elements.

As illustrated in FIG. 5, the interference suppression ratio R1 obtained in a case where the orthogonal code sequence W2 of the present embodiment is used is improved by 20 dB or more as compared with the interference suppression ratio R2 obtained in a case where the conventional orthogonal code sequence is used.

The embodiment according to the aspect of the present disclosure has been described above. Modifications are described below.

Modification 1

In the above embodiment, a case where an MIMO radar using a coded pulse is used has been described. However, the present disclosure is also applicable to a radar system using a frequency-modulated pulse wave such as a chirp pulse radar.

Figure 6:
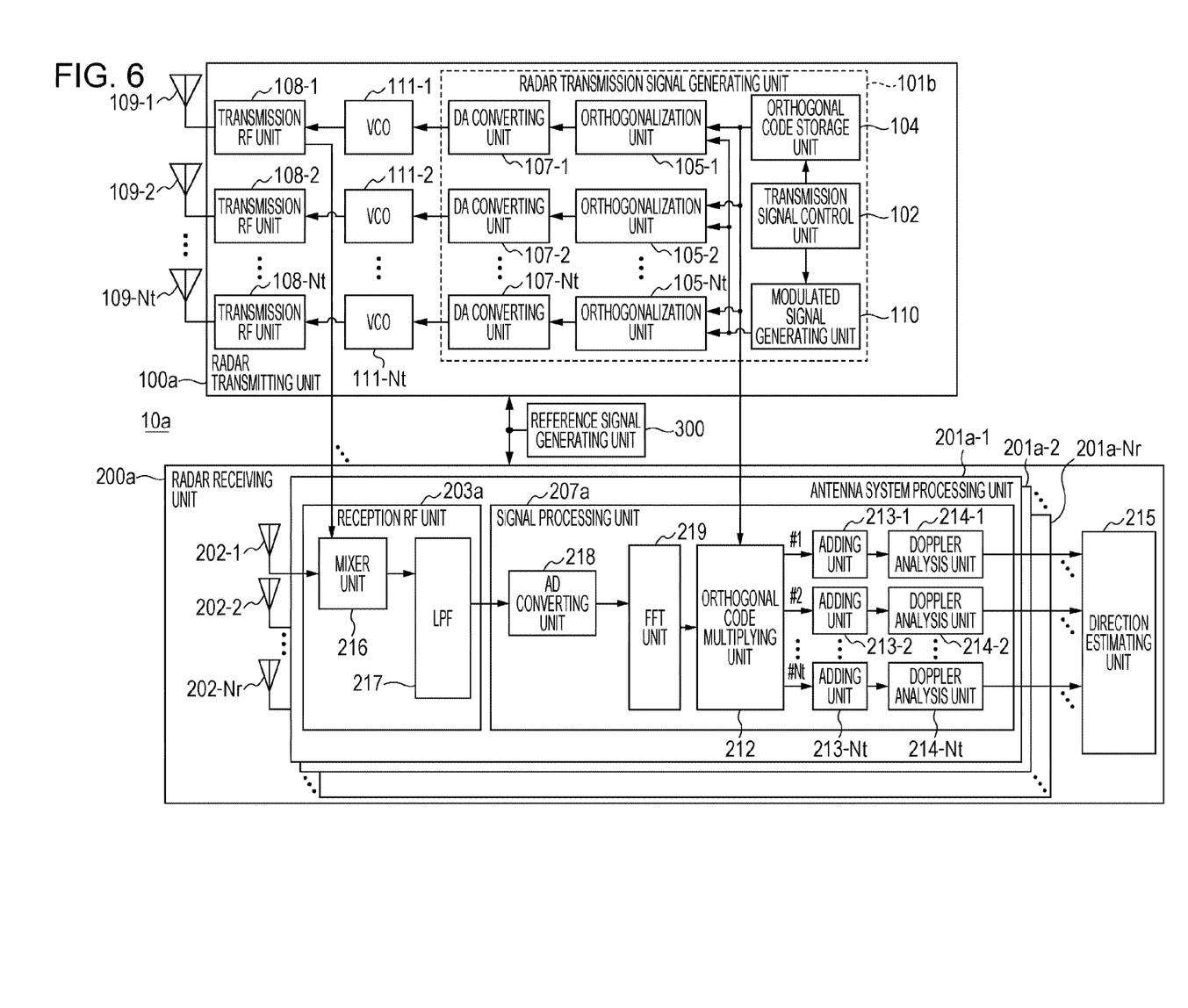
FIG. 6 is a block diagram illustrating a configuration of a radar device according to Modification 1 of the present disclosure.

A configuration of a radar device using a chirp pulse as a pulse sequence is described with reference to FIG. 6. FIG. 6 is a diagram illustrating an example of a configuration of a radar device 10a according to the present modification. In FIG. 6, constituent elements that are identical to those in FIG. 1 are given identical reference signs, and detailed description thereof is omitted.

A radar transmitting unit 100a of the radar device 10a illustrated in FIG. 6 is different from the radar transmitting unit 100 of the radar device 10 illustrated in FIG. 1 in that the radar transmitting unit 100a includes VCOs (voltage controlled oscillators) 111-1 to 111-Nt instead of the DA converting units 107-1 to 107. Furthermore, the radar transmitting unit 100a is different from the radar transmitting unit 100 in that a radar transmission signal generating unit 101b includes a modulated signal generating unit 110 instead of the code generating unit 103 and includes DA converting units 107-1 to 107Nt instead of the modulation units 106-1 to 106-Nt.

A radar receiving unit 200a of the radar device 10a illustrated in FIG. 6 is different from the radar receiving unit 200 of the radar device 10 illustrated in FIG. 1 in that a reception RF unit 203a includes a mixer unit 216 and an LPF 217 instead of the amplifier 204, the frequency converting unit 205, and the quadrature detection unit 206. Furthermore, the radar receiving unit 200a is different from the radar receiving unit 200 in that a signal processing unit 207a includes an A/D converting unit 218 instead of the A/D converting units 208 and 209 and includes an FFT unit 219 instead of the correlation computation unit 211.

First, transmission processing is described.

In the radar transmitting unit 100a, a transmission signal control unit 102 controls an orthogonal code storage unit 104 and the modulated signal generating unit 110, for example, assuming that Nb=1 and $N_{code}=1$. The orthogonal code storage unit 104 stores therein an orthogonal code sequence that satisfies the formulas (5) to (7).

Figure 7A:
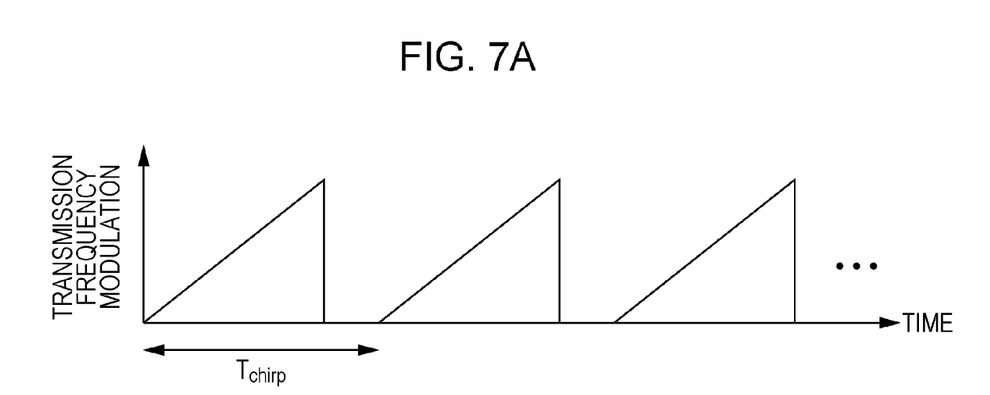
FIG. 7A is a diagram illustrating a transmission chirp pulse according to Modification 1 of the present disclosure.

FIG. 7A is a diagram illustrating a transmission chirp pulse. As illustrated in FIG. 7A, the modulated signal generating unit 110 periodically generates, for example, a saw-tooth-shaped modulated signal under control of the transmission signal control unit 102. A radar transmission period is $T_{chirp}$.

A z-th (z=1, . . . , Nt) DA converting unit 107 converts a digital signal that is output by a z-th (z=1, . . . , Nt) orthogonalization unit 105 into a baseband radar transmission signal that is an analog signal and then supplies the baseband radar transmission signal to corresponding one of the VCOs 111-1 to 111-Nt.

A z-th (z=1, . . . , Nt) VCO 111 supplies a frequency modulated signal to corresponding one of transmission RF units 108-1 to 108-Nt on the basis of the radar transmission signal supplied from the z-th DA converting unit 107.

The transmission RF unit 108-1 supplies some signals to the mixer unit 216 of the radar receiving unit 200a via a directional coupler (not illustrated). The other signals are supplied to the transmission antenna 109-1.

Next, reception processing is described. In the reception processing described below, an operation using a beat frequency fb instead of the discrete time k described in the above embodiment is performed.

Figure 7B:
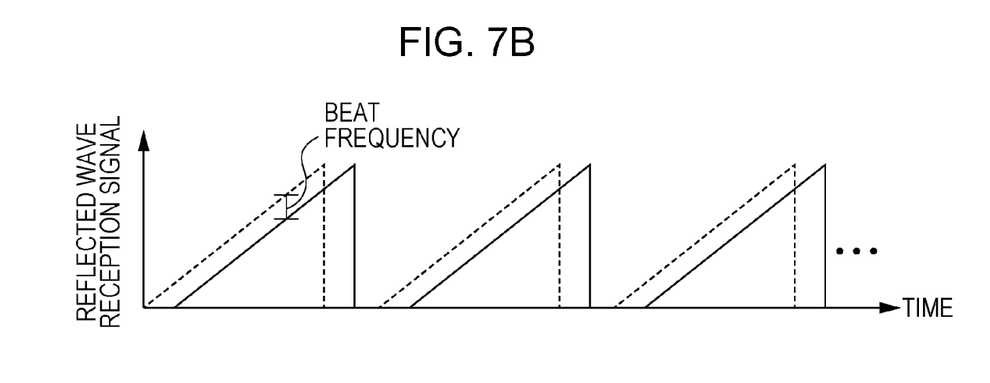
FIG. 7B is a diagram illustrating a reflected wave reception signal according to Modification 1 of the present disclosure.

The reception RF unit 203a of the radar receiving unit 200a mixes a transmission signal (a signal supplied from the transmission RF unit 108-1) with a reflected wave signal received by the mixer unit 216 and then causes the transmission signal to pass through the LPF 217. A beat signal having a frequency according to a delay time of the reflected wave signal is thus extracted. FIG. 7B is a diagram illustrating the reflected wave reception signal. For example, as illustrated in FIG. 7B, a beat frequency between frequencies is output from the LPF 217.

The signal that is output from the LPF 217 is supplied to the FFT unit 219 via the A/D converting unit 218 in the signal processing unit 207a. The FFT unit 219 performs FFT processing on ($N_{data}$) sample data per transmission period $T_{chirp}$. This allows the signal processing unit 207a to obtain a frequency spectrum in which a peak according to the beat frequency appears in accordance with the delay time of the reflected wave signal.

Beat frequency spectrum response obtained by m-th chirp pulse transmission is expressed by CI_chirp(fb,m) where fb is a bin number of FFT and fb=1, . . . , $N_{data}/2$.

An orthogonal code multiplying unit 212 multiplies (CI_chirp$^{(d)}$(fb,m)×oc(z)$_{\beta(m)}$*) the beat frequency spectrum response CI_chirp(fb,m) that is output by the FFT unit 219 for each beat frequency fb by a complex conjugate value oc(z)$_{\beta(m)}$* of an element oc(z)$_{\beta(m)}$ of an orthogonal code sequence that is output for each multiplexed signal in accordance with an element output instruction given by the transmission signal control unit 102. Note that z=1, . . . , Nt, and d=1, . . . , Nr.

Adding units 213 add up CI_chirp$^{(d)}$(fb,m)×oc(z)$_{\beta(m)}$* that is output by the orthogonal code multiplying unit 212 for each beat frequency fb over plural (Np) radar transmission periods $T_{chirp}$ ($T_{chirp}$×Np). The addition in the adding units 213 can be expressed by the following formula (23):

$$CI_{(2)}^{(d)}(fb, m_c) = \sum_{g=1}^{N_p} CI\_chirp^{(d)} \quad \text{formula (23)}$$
$$(fb, N_p(m_c - 1) + g) \times oc(z)^*_{\text{mod}[ceil[g/Nb]-1,Loc]+1}$$

In the formula (23), mod [x,y] is an operator indicative of a remainder of division (x/y). By setting Np to an integer multiple of (Nb×$L_{oc}$) that is an orthogonalization unit of an orthogonal code sequence, code demultiplexing of Nt code multiplexed signals can be performed before Doppler analysis. In the formula (23), $m_c$ is a natural number.

Doppler analysis units 214 perform coherent integration while uniforming beat frequencies fb by using, as a single unit, $CI_{(2)}^{(d)}$(fb,Nc(w−1)+1) to $CI_{(2)}^{(d)}$(fb,Nc×w) that are output of the adding units 213 obtained for each beat frequency fb. For example, the Doppler analysis units 214 perform coherent integration after correcting a phase fluctuation φ(fs)=2πfs($T_{chirp}$×Np)Δφ according to 2Nf different Doppler frequencies fsΔφ as indicated by the following formula (24):

$$FT\_CI_{(2)}^{(d)}(fb, f_s, w) = \sum_{q=0}^{N_c-1} CI_{(2)}^{(d)}(fb, N_c(w-1) + q + 1)\exp[-j\phi(f_s)q] \quad \text{formula (24)}$$
$$= \sum_{q=0}^{N_c-1} CI_{(2)}^{(d)}(fb, N_c(w-1) + q + 1)\exp$$
$$[-j2\pi f_s T_{chirp} N_p q \Delta\phi]$$

In the formula (24), FT_CI$_{(z)}^{(d)}$(fb,fs,w) is a w-th output of the Doppler analysis units 214 and is a coherent integration result of the Doppler frequencies fsΔφ at the beat frequency fb for a z-th transmission signal. Note that d=1, . . . , Nr, q=0, . . . , Nc−1, and fs=−Nf+1, . . . , 0, . . . , Nf. Note also that w is a natural number, and Δφ is a phase rotation unit.

This allows the radar receiving unit 200a to obtain FT_CI$_{(1)}^{(d)}$(fb,−Nf+1,w), . . . , FT_CI$_{(Nt)}^{(d)}$(fb,Nf−1,w), which are results of coherent integration according to 2Nf Doppler frequency components at each beat frequency fb for transmission signals #1 to #Nt, every plural (Nc) radar transmission periods $T_{chirp}$ ($T_{chirp}$×Np×Nc). Note that j is an imaginary unit.

With the above arrangement and operation, the present modification can also obtain an effect that interference between code multiplexed signals is reduced in a case where a Doppler frequency shift occurs, as in the above embodiment.

Modification 2

In the radar device 10 illustrated in FIG. 1, the radar transmitting unit 100 and the radar receiving unit 200 may be individually disposed in physically separate places. Furthermore, in the radar device 10a illustrated in FIG. 6, the radar transmitting unit 100a and the radar receiving unit 200a may be individually disposed in physically separate places.

Modification 3

The radar device 10 illustrated in FIG. 1 and the radar device 10a illustrated in FIG. 6 include, for example, a CPU (Central Processing Unit), a storage medium such as a ROM (Read Only Memory) in which controls programs are stored, and a working memory such as a RAM (Random Access Memory), each of which is not illustrated. In this case, the functions of the above units are realized by CPU's execution of the control programs. However, the hardware configurations of the radar devices 10 and 10a are not limited to this example. For example, each functional unit of the radar devices 10 and 10a may be realized as an IC (Integrated Circuit). The functional units may be realized by individual chips or some or all of the functional sections may be realized by a single chip.

Summary of Present Disclosure

A radar device of the present disclosure includes: radar transmitting circuitry which, in operation, generates Nt radar signals by modulating Nt transmission code sequences and transmits the generated Nt radar signals via Nt transmission antennas that are different from each other, Nt being more than 1; and radar receiving circuitry which, in operation, receives reflection wave signals that are the radar signals reflected by a target via Nr reception antennas, performs Doppler frequency analysis, Nr being more than 1, wherein the radar transmitting circuitry stores a predetermined pulse sequence and Nt or more orthogonal code sequences that have a predetermined code length and are orthogonal to each other, second half elements of the Nt or more orthogonal code sequences are arranged in an order reverse to first half elements of the Nt or more orthogonal code sequences and generates each of the Nt transmission code sequences by multiplying elements of the predetermined pulse sequence by elements of the Nt or more orthogonal code sequences that are different from each other.

The radar device of the present disclosure may be arranged such that the predetermined pulse sequence is two or more even-numbers of complementary codes or a Spano code that is a combination of a plurality of complementary codes.

The radar device of the present disclosure may be arranged such that the predetermined pulse sequence is a chirp pulse.

The embodiment and modifications have been described above with reference to the drawings. Needless to say, however, the present disclosure is not limited to these examples. It is apparent that a person skilled in the art can arrive at various changes and modifications within the scope described in the claims, and it is understood that these changes and modifications are also encompassed within the technical range of the present disclosure. Furthermore, the constituent elements in the embodiment and the modifications may be combined in any ways within the scope of the disclosure.

In the embodiment and the modifications, an example in which the present disclosure is realized by hardware has been described. However, the present disclosure can be also realized by software in combination with hardware.

The functional blocks used for description of the embodiment or the modifications are typically realized by an LSI that is an integrated circuit having an input terminal and an output terminal. The integrated circuit may control the functional blocks used for description of the embodiment or the modifications and include input and output. These functional blocks may be realized as individual chips or some or all of the constituent elements may be realized as a single chip. The term "LSI" is used, but the term "IC", "system LSI", "super LSI", or "ultra LSI" may be used depending on the degree of integration.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique. One possibility is application of a biotechnology or the like.

The present disclosure is suitable as a radar device that detects a wide-angle range.

What is claimed is:

1. A radar device comprising:
  a radar transmitter which, in operation, generates Nt radar signals by modulating Nt transmission code sequences and transmits the generated Nt radar signals via Nt transmission antennas that are different from each other, Nt being three or greater; and
  a radar receiver which, in operation, receives reflection wave signals that are the radar signals reflected by a target via Nr reception antennas and performs Doppler frequency analysis, Nr being greater than 1, wherein:
  the radar transmitter stores a predetermined pulse sequence and Nt orthogonal code sequences, wherein the Nt orthogonal code sequences are different from each other,
  each of the Nt orthogonal code sequences has an even number of elements, elements of a second half of an Nt orthogonal code sequence are identical to elements of a first half of an Nt orthogonal code sequence but are arranged in an order reverse to the elements of the first half of the Nt orthogonal code sequence, and
  the radar transmitter generates each of the Nt transmission code sequences by multiplying each element of each Nt orthogonal code sequence by all of elements of the predetermined pulse sequence.

2. The radar device according to claim 1, wherein the predetermined pulse sequence is two or more even number of complementary codes or a Spano code that is a combination of a plurality of complementary codes.

3. The radar device according to claim 1, wherein the predetermined pulse sequence is a chirp pulse.

4. The radar device according to claim 1, wherein the radar transmitter sequentially outputs, for each transmission period, a corresponding one of the Nt transmission code sequences.

* * * * *